United States Patent [19]

Henton et al.

[11] Patent Number: 5,219,933
[45] Date of Patent: Jun. 15, 1993

[54] BLENDS OF POLYCARBONATE AND THERMOPLASTIC POLYURETHANE RESINS CONTAINING AN IMPACT MODIFIER

[75] Inventors: David E. Henton; Duane M. Naeger; F. Michael Plaver, all of Midland, Mich.

[73] Assignee: The Dow Chemical Company, Midland, Mich.

[21] Appl. No.: 674,808

[22] Filed: Mar. 25, 1991

[51] Int. Cl.$^5$ .................. C08L 69/00; C08L 75/06; C08L 75/04
[52] U.S. Cl. ..................................... 525/66; 525/67; 525/133
[58] Field of Search ................... 525/66, 67, 133

[56] References Cited

U.S. PATENT DOCUMENTS

| | | |
|---|---|---|
| 3,431,224 | 3/1969 | Goldblum . |
| 4,034,016 | 7/1977 | Baron et al. . |
| 4,179,479 | 12/1979 | Carter ................... 525/66 |
| 4,342,847 | 8/1982 | Goyert et al. ............ 525/66 |
| 4,350,799 | 9/1982 | Schmelzer et al. ........ 525/453 |
| 4,413,101 | 5/1983 | Schmidt ................. 525/440 |
| 4,522,979 | 6/1985 | Chung et al. ............ 525/66 |
| 4,743,650 | 5/1988 | Boutni ................... 525/66 |
| 4,912,177 | 3/1990 | Skochdopole ............ 525/66 |
| 4,929,674 | 5/1990 | Nouvertne ............... 525/66 |
| 4,968,756 | 11/1990 | Silvis et al. ............ 525/399 |
| 5,134,195 | 7/1992 | Tacke ................... 525/453 |

FOREIGN PATENT DOCUMENTS

| | | |
|---|---|---|
| 104695 | 4/1984 | European Pat. Off. . |
| 125739 | 11/1984 | European Pat. Off. . |
| 396244 | 11/1990 | European Pat. Off. . |
| 3925635 | 2/1991 | Fed. Rep. of Germany . |

Primary Examiner—David J. Buttner

[57] ABSTRACT

This invention is a thermoplastic blend based on polycarbonate, thermoplastic polyurethane and an impact modifier. These resins have been found to be suitable for preparing molded or shaped articles having excellent combinations of processability, heat resistance, flexibility, solvent resistance and low temperature toughness. These resins comprise (a) about 35 to about 65 percent by weight of a thermoplastic aromatic polycarbonate; (b) about 35 to about 65 percent by weight of a thermoplastic polyurethane; and (c) about 1 to about 20 percent by weight of an impact modifier, which weight percentages are based on the combined weights of the polycarbonate and thermoplastic polyurethane. A preferred embodiment of the present invention is a thermoplastic automobile part, such as a bumper facia, prepared from such a thermoplastic resin.

10 Claims, No Drawings

BLENDS OF POLYCARBONATE AND THERMOPLASTIC POLYURETHANE RESINS CONTAINING AN IMPACT MODIFIER

This invention relates to a thermoplastic resin blend of a aromatic carbonate polymer, a thermoplastic polyurethane and an impact modifier.

BACKGROUND OF THE INVENTION

Thermoplastic carbonate polymers are readily molded at elevated temperatures to make a wide variety of articles such as automotive parts, tool housings and similar structural components. However, carbonate polymers have a number of deficiencies which tend to limit their use, including sensitivity of impact resistance to the ambient temperature, a relatively high processing temperature and susceptibility to degradation by solvents including water and hydrocarbons. Therefore, there have been numerous attempts to overcome or compensate for the deficiencies of carbonate polymers by blending them with one or more other polymeric additives.

Thermoplastic polyurethanes when used at low levels (less than 30 weight percent) are known to have an impact modification effect and to improve the toughness of rigid polycarbonates. At higher levels of TPU, however, little additional improvement in toughness is obtained, particularly in the low temperature toughness which is needed for a variety of applications such as automotive parts. Additional amounts of an impact modifier would therefore not be expected to serve to improve the low temperature toughness of PC/TPU blends.

For example, U.S. Pat. No. 4,743,650 discloses binary blends containing polycarbonate and from 5 to about 35 parts by weight of a polyether-based thermoplastic polyurethane ("TPU"). U.S. Pat. No. 4,179,479 discloses similar blends containing polycarbonate, from 40 to 100 parts TPU and a processing aid. However, due to the inherent problems of compatibility between polycarbonate and TPU, which include large differences in melt viscosities, processing temperatures and thermodynamic solubilities, the preparation of blends of TPU and polycarbonate having good combinations of toughness (especially at low temperature), heat resistance, solvent resistance and processability has not been accomplished.

In certain outdoor applications, such as automotive applications, it would be desirable to employ thermoplastic blend resins due to their light weight and resistance to rusting. However these advantages together with their excellent balance of physical properties at standard temperatures of 0° F. and above were outweighed by their brittle failure at low temperatures of −10° F. and below. Accordingly, it would be desirable to provide an improved blend of carbonate polymer and TPU with an improved balance of low flexural modulus, heat resistance, solvent resistance and toughness while maintaining an efficient level of processability. This would provide highly desirable thermoplastic resins which can be used in more demanding applications.

For example, for the preparation of thermoplastic automobile bumper facia or similar parts for outdoor applications it is important for the thermoplastic resin part to possess (a) good flexibility as exhibited by a flexural modulus value of less than about 200,000 pounds per square inch (psi) 1380 megaPascals (MPa), (b) good heat resistance as exhibited by a heat distortion temperature under load of at least 100° F. at 66 psi or 37° C. at 0.45 MPa, and (c) good low temperature toughness as exhibited by a notched Izod impact resistance of at least 5 foot pounds per inch (ft lbs/in) at −30° F. or 49 Joules per meter (J/m) at −34° C. More preferably a thermoplastic resin will have a modulus value of less than about 175,000 psi (1200 MPa), a heat distortion temperature under load of at least 120° F. (49° C.) at 66 psi (0.45 MPa), and a notched Izod impact resistance of at least 5 ft lbs/in (49 J/m) at −40° F. (−40° C.).

SUMMARY OF THE INVENTION

It has surprisingly been found that low levels of an additional impact modifier (from about 1 to about 20 weight percent based on blend weight) in a PC/TPU blend containing relatively high levels of TPU (from about 35 to about 65 weight percent based on the TPU and PC components) would provide a thermoplastic resin with a desirable combination of low flexural modulus (flexibility), toughness, particularly at low temperatures, processability, heat resistance and solvent resistance. This invention is a thermoplastic resin blend comprising:

(a) from about 35 to about 65 percent by weight based on the combined weights of (a) and (b) of a thermoplastic aromatic carbonate polymer having a molecular weight of from about 12,000 to about 100,000;

(b) from about 65 to about 35 percent by weight based on the combined weights of (a) and (b) of a thermoplastic polyurethane; and (c) from about 1 to about 20 percent by weight based on the combined weights of (a) and (b) of an impact modifier.

According to this invention, it has been found that some of the difficulties encountered in the blending of carbonate polymers and TPU's and obtaining optimized properties can be addressed with the use of an impact modifier to produce a product which has significantly improved balance of properties including improved low temperature toughness.

A preferred embodiment of the present invention is a thermoplastic impact modified blend of polycarbonate and thermoplastic polyurethane which, when molded into a part, has a flexural modulus value of less than about 200,000 pounds per square inch (psi) or 1380 megaPascals (MPa), a heat distortion temperature under load of at least 100° F. at 66 psi or 37° C. at 0.45 MPa, and a notched Izod impact resistance of at least 5 foot pounds per inch (ft lbs/in) at −30° F. or 49 Joules per meter (J/m) at −34° C. More preferably a thermoplastic resin blend of the present invention will have a modulus value of less than about 175,000 psi (1200 MPa), a heat distortion temperature under load of at least 120° F. (49° C.) at 66 psi (0.45 MPa), and a notched Izod impact resistance of at least 5 ft lbs/in (49 J/m) at −40° F. (−40° C.). A further embodiment of this invention is an automobile bumper facia prepared from such a thermoplastic resin.

DETAILED DESCRIPTION OF THE INVENTION

The blend resin comprises a thermoplastic aromatic carbonate polymer in an amount of from at least about 35, preferably from at least about 40, to about 65, preferably about 60 percent, by weight of the combined weight of thermoplastic aromatic carbonate polymer (a) and the thermoplastic polyurethane (b) in the blend.

The TPU is present in the blend in amounts of from at least about 35, preferably from at least 40 up to about 65 and preferably to about 60 percent by weight of the combined weights of (a) and (b).

The impact modifier is present in the blend in amounts of from at least about 1, preferably from at least about 4, up to about 20, preferably up to about 15 percent by weight of the combined weights of (a) and (b).

Suitable thermoplastic aromatic carbonate polymers that can be used in the practice of this invention are those aromatic homopolycarbonates and aromatic copolycarbonates advantageously having a molecular weight of from about 12,000 to 100,000 with the low molecular weight (high flow) resins (15,000 to 35,000 molecular weight) most preferred. As used herein, the term molecular weight refers to the weight average molecular weight of the polymer (Mw) as measured by gel permeation chromatography.

The polycarbonate advantageously has a melt flow rate of at least about 0.1 grams per 10 minutes (g/10 min), preferably at least about 1 g/10 min, and more preferably at least about 2 g/10 min but preferably less than about 100 g/10 min, more preferably less than 90 g/10 min and most preferably less than 85 g/10 min as measured by the ASTM Procedure D-1238 at a temperature of 300° C. with 1.2 kilogram (kg) weight.

Polycarbonates suitable for use in this present invention are preferably prepared from dihydroxy compounds according to the structures of the following Formula I or Formula II:

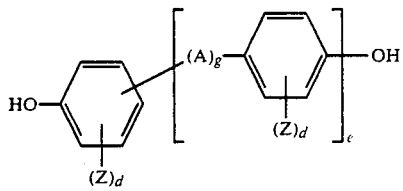

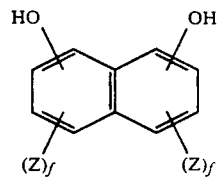

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, an aromatic group with 6 to 15 carbon atoms, a carbonyl group, an oxygen atom, a sulfur atom, an —SO— or —SO$_2$— radical or a radical of the general Formula III:

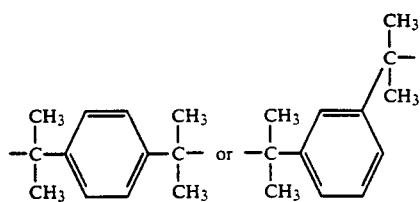

g denotes the number 0 or 1; e denotes the number 0 or 1; Z denotes (in addition to any aromatic H atoms) F, Cl or Br atoms or a C$_{1-3}$ alkyl and if several Z radicals are substituents in one aryl radical, they may be identical or different; d denotes 0 or an integer of from 1 to 4; and f denotes 0 or an integer of from 1 to 3. Preferred are the dihydroxy compounds where g is 1 and e is 1.

Among the useful dihydroxy compounds in the practice of the invention are hydroquinone, resorcinol, bis-(hydroxyphenyl)alkanes, bis-(hydroxyphenyl)cycloalkanes, bis-(hydroxyphenyl)ethers, bis-(hydroxyphenyl)ketones, bis-(hydroxyphenyl)sulfoxides, bis-(hydroxyphenyl)sulfones and α,α-bis-(hydroxyphenyl)-diisopropylbenzenes. Further specific examples of suitable dihydroxy compounds are the bisphenols including 2,2-bis-(4-hydroxyphenyl)propane (bisphenol A), 2,4-bis-(4-hydroxyphenyl)-2-methylbutane, 1,1-bis-(4-hydroxyphenyl)cyclohexane, α,α-bis-(4-hydroxyphenyl-p-diisopropylbenzene, 2,2-bis-(3-chloro-4-hydroxyphenyl)propane, 2,2-bis-(3,5-dichloro-4-hydroxyphenyl)propane, 2,2-bis-(3,5-dibromo-4-hydroxyphenyl)propane and 1,1-bis-(4-hydroxyphenyl)-1-phenylethane hydroxybenzophenone and 4,4-sulfonyl diphenol.

The polycarbonates of the invention may entail in their structure units derived from one or more of the suitable dihydroxy compounds.

The most preferred dihydroxy compounds are the bisphenols according to Formula I where A denotes an alkylene group with 1 to 8 carbon atoms or an aromatic group with 6 to 15 carbon atoms, g is 1 and e is 1, Z denotes (in addition to any aromatic H atoms) F, Cl or Br atoms or a C$_{1-3}$ alkyl; d denotes 0 or an integer of from 1 to 4, and especially preferred is 2,2-bis-(4-hydroxyphenyl)propane (bisphenol A).

The preparation of polycarbonate resins may be carried out in accordance with any of the processes known in the art, for example, by the interfacial polycondensation process, polycondensation in a homogeneous phase or by transesterification. The suitable processes and conditions have been disclosed in the literature and are not critical to the claimed invention.

In the preparation of the polycarbonate resins of the invention, monofunctional reactants such as monophenols may be used in order to limit their respective molecular weights. Also, branching may be obtained by the incorporation, in the respective processes, of small amounts, preferably of between about 0.05 and 2.0 molecular percent (relative to the dihydroxy compound employed) of branching agents which are at least trifunctional compounds, especially, compounds having three or more phenolic hydroxyl groups.

Some examples of compounds with at least three or more phenolic hydroxyl groups which can be used are phloroglucinol; 4,6-dimethyl-2,4,6-tri-(4-hydroxyphenyl)heptane; 2,4,6-trimethyl-2,4,6-tri-(4-hydroxyphenyl)heptane; 1,4,5-tri-(4-hydroxyphenyl)benzene; 1,1,1-tri-(4-hydroxyphenyl)ethane; tri-(4-hydroxyphenyl)phenylmethane; 2,2-bis-(4,4-bis-(4-hydroxyphenyl)cyclohexyl)propane; 2,4-bis-(4-hydroxyphenylisopropyl)phenol; 3,6-bis-(2-hydroxy-5'-methylbenzyl)-4-methylphenol; 2-(4-hydroxyphenyl)-2-(2,4-dihydroxyphenyl)propane; hexa(4-(4-hydroxyphenylhexa(4-(4-hydroxyphenylisopropyl)phenyl)orthoterephthalic acid ester; tetra-(4-hydroxyphenyl)methane; tetra-(4-(4-hydroxyphenylisopropyl)phenoxy)methane and 1,4-bis-(4',4"-dihydroxytriphenyl)methyl)benzene. Some of the other trifunctional compounds are 2,4-dihydroxybenzoic acid; trimellitic acid; trimesic acid; cyanuric chloride and 3,3-bis-(4-hydroxyphenyl)-2-oxo-2,3-dihydroindole.

The thermoplastic polyurethanes which are suitable for the practice of this invention are substantially linear, elastomeric polymers and have thermoplastic processing characteristics. They may be prepared from the reaction of an organic polyisocyanate, preferably a diisocyanate with a polyahl composition which comprises a polycaprolactone polyol, or a polyester polyol or a polyether polyol, and a chain extender. For example, polycaprolactone polyol-based TPU, polyester polyol-based TPU and polyether polyol-based TPU can be used in the practice of this invention. These thermoplastic polyurethanes can be prepared by known methods such as disclosed in U.S. Pat. Nos. 3,214,411 and 4,376,834, the teachings of which are incorporated herein by reference. In a preferred embodiment the thermoplastic polyurethanes which can be used in this present invention are the generally elastomeric polyester polyol-based TPUs.

The Shore Hardness of the suitable thermoplastic polyurethanes, measured according to ASTM D-2240, will typically run from about 70A on the "A" scale up to about 70D on the "D" scale. The TPU's used in the present invention will preferably have a Shore Hardness of from about 70A to about 100A, and more preferably from about 75A to about 95A. The hardness scales start with the "A" scale being the softest and the "D" scale being harder while the larger numbers indicate harder TPU's within a particular scale.

In general the TPU's suitable for use in the claimed blends have weight average molecular weights in the range of 20,000 to 400,000, preferably 30,000 to 250,000 and more preferably 35,000 to 200,000 as measured versus a polyethylene oxide standard by gel permeation chromatography using dimethyl formamide as eluent.

The preferred TPU's for the practice of this invention having 75 A to 95 A shore hardness values are further characterized in that they advantageously have a melt flow rate of at least about 0.5 g/10 min, preferably at least about 1 g/10 min, more preferably at least about 1.5 g/10 min and advantageously have a melt flow rate less than or equal to about 100 g/10 min, preferably less than or equal to about 70 g/10 min and more preferably less than or equal to about 25 g/10 min. Melt flow rates for TPU's in this range are usually determined according to procedure ASTM D-1238 with the 70 A to 80 A hardness TPU's tested, for example, at 190° C. with an 8.7 kilogram (kg) weight and the 90 A through 95 A hardness TPU's tested, for example, at 224° C. with a 1.26 kg weight.

It has been found that the preferred TPU's have been prepared from a polyester polyol having a weight average molecular weight of at least about 500, more preferably at least about 750, and most preferably at least about 1000, but having a molecular weight less than about 10,000, preferably less than about 8,000 and more preferably less than about 5,000. The functionality of the polyol indicated by the number of isocyanate-reactive hydrogens per molecule, is advantageously not greater than about 6, and is preferably about 2.

Particularly useful polyester polyols which may be used as starting material for preparing the polyester polyol-based thermoplastic polyurethanes are those produced from divalent carboxylic acids or the anhydrides of these acids and a glycol having at least one, preferably two primary hydroxyl groups. Suitable divalent carboxylic acids include adipic acid, succinic acid, suberic acid, sebacic acid, oxalic acid, methyladipic acid, glutaric acid, pimelic acid, azelaic acid, phthalic acid, terephthalic acid, isophthalic acid and the like, and anhydrides of the above. Preferred polyester polyols for the present invention are those prepared from adipic acid.

By way of example, adipic acid is condensed with a suitable glycol or mixtures of glycols which have at least one primary hydroxyl group. The condensation is stopped when an acid number of from about 0.5 to about 2.0 is reached. The water formed during the reaction is simultaneously removed so that the final water content of the resulting product is from about 0.01 to about 0.02, preferably from about 0.01 to about 0.05 percent by weight.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethylpropylene glycol, 1,3-propylene glycol and the like. In addition to the glycols, a small amount of trihydric alcohol, up to about 1 percent may be used along with the glycols such as, for example, trimethylolpropane, glycerine, hexanetriol and the like. The molecular weight of the polyester polyol can be increased if desired by further reacting with an oxirane such as, for example, ethylene oxide or propylene oxide.

Any of the organic polyisocyanates and diisocyanates employed in the preparation of polyurethanes can be employed in preparing the TPUs required for the present invention. Illustrative of such isocyanates are: methylene bis(phenylisocyanates) (MDI) including the 4,4'-isomer, the 2,4'-isomer and mixtures thereof, meta- and para-phenylene diisocyanates, chlorophenylene diisocyanates, alpha,alpha'-xylylene diisocyanate, 2,4- and 2,6-toluene diisocyanate and mixtures of these latter two isomers which are available commercially, toluidine diisocyanate, hexamethylene diisocyanate, 1,5-naphthalene diisocyanate, isophorone diisocyanate and methylene bis(cyclohexylisocyanate) including the 4,4'-isomer and 2,4'-isomer, and mixtures thereof.

Preferably, the organic polyisocyanate employed to prepare the TPUs useful in this invention is methylene bis(phenylisocyanate), also referred to as 2-ring MDI, in the form of the 4,4'-isomer as well as mixtures of the 4,4'-isomer with amounts (up to about 70 percent by weight) of the 2,4'-isomer and modified forms of these diisocyanates having more than 2 rings. By the latter are meant those forms of methylene bis(phenylisocyanate) which have been treated to render them stable liquids at ambient temperature. Such products include those which have been reacted with a minor amount (up to 0.2 equivalents per equivalent of a polyphenyl polyisocyanate) of an aliphatic glycol or mixture of aliphatic glycols; such modified methylene bis(phenylisocyanates) are described in U.S. Pat. Nos. 3,394,164; 3,883,571; 4,115,429; 4,118,411 and 4,299,347; and those wherein a minor amount of the diisocyanate has been converted to the corresponding carbodiimide as described in U.S. Pat. No. 3,384,653. Mixtures of the above-described polyisocyanates can be employed if desired.

The chain extenders which are used in making the TPUs required by the present invention are aliphatic straight- and branched chain diols including cycloaliphatic diols, preferably having from 2 to 8 carbon atoms, inclusive, in the chain. Illustrative of such diols are ethylene glycol, 1,3-propanediol, 1,5-pentanediol, 1,6-hexanediol, 1,2-propanediol, 1,3-butanediol, 1,4-butanediol, 2,3-butanediol, 1,3-pentanediol, 1,2-hexanediol, 3-methylpentane-1,5-diol, 1,4-cyclohexane dimethanol, hydroquinone and the like including mixtures of two or more such diols.

The chain extenders which can be used alone or in admixture with each other or any one of the above diols also include diethylene glycol, dipropylene glycol, tripropylene glycol, ethanolamine, n-methyl diethanolamine, n-ethyl diethanolamine and the like, as well as ester diols obtained by esterifying adipic, azelaic, glutaric and the aliphatic dicarboxylic acids with aliphatic diols such as those exemplified above utilizing from 0.01 to 0.8 mole of acid per mole of diol. Also included in the chain extenders which can be used in preparing the TPUs are adducts obtained by an aliphatic diol or triol such as 1,4-cyclohexane dimethanol, neopentyl glycol, hexane-1,2-diol, ethylene glycol, butane-1,4-diol, trimethylolpropane, and the like, with caprolactone in a mole ratio of from 0.01 to 2 moles of caprolactone per mole of diol or triol.

While any of the diol extenders described and exemplified above can be employed in preparing the thermoplastic polyurethane, alone, or in admixture, it is preferred to use 1,4-butanediol, 1,6-hexanediol, neopentyl glycol, 1,4-cyclohexane dimethanol, ethylene glycol and diethylene glycol either alone or in admixture with each other.

The hardness of the TPU is controlled in part by the quantity and type of chain extender employed in its preparation. Larger amounts of chain extender generally give harder TPU's. Therefore, less chain extender is desirably employed to provide the preferred generally elastomeric TPU's advantageously used to prepare the blends according to this invention.

The polyol, the organic polyisocyanate and the chain extender may be individually heated preferably to a temperature of from about 60° C. to about 135° C. and then the polyol and chain extender may be substantially simultaneously mixed with the polyisocyanate. Preferably, the chain extender and the polyol, each of which has been previously heated, are first mixed and the resulting mixture is mixed with the heated polyisocyanate. This method is preferred for the reason that the extender and the polyester will not react prior to the introduction of polyisocyanate and rapid mixing with the polyisocyanate is thus facilitated.

Advantageously, the rate of reaction may be increased by adding any suitable catalyst to the reaction mixture such as tertiary amines, metal salts and the like set forth in U.S. Pat. Nos. 2,620,516; 2,621,166 and 2,729,618 all incorporated herein by reference.

Other techniques for the production of thermoplastic polyurethanes useful in the context of the present invention are disclosed in the text "Polyurethanes: Chemistry and Technology", Vol. 2, pp. 299–452 by J. H. Saunders and K. C. Frisch, Interscience Publishers, New York (1964) incorporated herein by reference.

Suitable thermoplastic polyurethanes are commercially available and include certain of the TPU's sold by The Dow Chemical Company under the brand name PELLETHANE TM and related TPU's containing hard and soft segments.

The impact modifiers which are most suitable for the practice of this invention contain both a rubbery component and a grafted rigid phase component. Preferred impact modifiers are prepared by grafting a (meth)acrylate and/or vinyl aromatic polymer, including copolymers thereof such as styrene/acrylonitrile, onto the selected rubber. Preferably the graft polymer is a homo- or copolymer of methylmethacrylate.

The rubber material can be, for example, one or more of the well known butadiene-, butyl acrylate-, or EPDM-types. Preferably the impact modifier will contain at least about 40 weight percent of the rubber material, more preferably at least about 45 and most preferably at least about 60 weight percent of the rubber material. The impact modifier can contain up to 100 weight percent rubber (no rigid phase) and preferably contains less than 95 weight percent of the rubber material, more preferably less than 90 weight percent of the rubber material with the balance being a rigid phase polymer of which at least a significant portion is graft polymerized and/or crosslinked around or to the rubber material.

Preferred impact modifiers are the known methacrylate-butadiene-styrene ("MBS") rubbers such as Paraloid EXL 3607 and the known methylmethacrylate butylacrylate ("MBA") rubbers such as Paraloid 3300 which rubbers generally contain 45–90 weight percent elastomer.

A preferred impact modifier contains as rubber material a substrate polymer latex or core which is made by polymerizing a conjugated diene, or by copolymerizing a conjugated diene with a mono-olefin or polar vinyl compound, such as styrene, acrylonitrile or methyl methacrylate. The substrate rubber is typically made up of about 45 to 100 percent conjugated diene and up to about 55 percent of the mono-olefin or polar vinyl compound. A mixture of monomers is then graft polymerized to the substrate latex. A variety of monomers may be used for this grafting purpose, including vinyl aromatic compounds such as styrene, vinyl toluene, alpha-methyl styrene, halogenated styrene, naphthalene; acrylonitriles including methacrylonitrile or alpha-halogenated acrylonitrile; or a C1–C8 alkyl (meth)acrylate such as methyl acrylate, ethylacrylate, hexyl acrylate, methyl methacrylate, ethyl methacrylate or hexyl methacrylate; an acrylic or methacrylic acid; or a mixture of two or more of the foregoing. The extent of grafting is sensitive to the substrate latex particle size and grafting reaction conditions, and particle size may be influenced by controlled coagulation techniques among other methods. The rigid phase may be crosslinked during the polymerization by incorporation of various polyvinyl monomers such as divinyl benzene and the like.

The grafting monomers may be added to the reaction mixture simultaneously or in sequence, and, when added in sequence, layers, shells or wart-like appendages can be built up around the substrate latex, or core. The monomers can be added in various ratios to each other. A typical weight ratio for an MBS rubber is about 60 to 80 parts by weight substrate butadiene polymer rubber latex, about 40 to 20 parts by weight grafted methyl methacrylate polymer. A product having substantially such a composition is available commercially from Rohm and Haas Company as Paraloid TM EXL 3607 core-shell polymer. The MBS rubber and methods for making same, as described above, are discussed in greater detail in U.S. Pat. No. 3,287,443; U.S. Pat. No. 3,657,391 and U.S. Pat. No. 4,180,494.

Sufficient quantities of a filler may also be employed to give a desired increase in modulus and/or a decrease in the coefficient of linear thermal expansion of the blend. Advantageously, the quantity of filler employed is from about 2 to about 25 and is preferably from about 5 to about 15 weight percent of the combined weight of the thermoplastic aromatic polycarbonate (a) and thermoplastic polyurethane (b) in the blend.

In addition to the thermoplastic aromatic polycarbonate and thermoplastic polyurethane, the blend of the present invention may also comprise certain proportions of at least one member of the class consisting of polypropylene, polyethylene polyisobutylene, a copolymer of ethylene and an alkyl acrylate, a copolymer of ethylene and propylene, a rigid polyester such as PET or PBT, a cellulose ester, a polyamide, a polyvinyl acetal and an alkyl cellulose ether.

The blends of the present invention can be melt extruded or molded to form articles such as automotive parts, tool housings, structural components, recreational objects, household appliances and enclosures for transportation or communication and the like. The use of the blends of the invention in place of thermoplastic polycarbonate in such applications is particularly advantageous where in the application there is a risk of the article coming into contact with organic solvents, especially hydrocarbon solvents.

The following examples are given to illustrate the invention and should not be interpreted as limiting it in any way. Unless stated otherwise, all parts and percentages are given by weight.

The following materials are used in the examples. All thermoplastic polyurethanes described herein below are adducts of methane diphenylisocyanate (MDI).

Thermoplastic Polyurethane (TPU)

The TPU used was a thermoplastic polyurethane prepared from a polycaprolactone polyol having a Shore Hardness of 80A (ASTM D-2240) and an estimated tensile strength of 5500 psi (35 MPa) (ASTM D-412) and a melt flow rate (MFR) (ASTM D-1238-85) of 8 g/10 minutes at 190° C. and 8.7 kg. The weight average molecular weight of the TPU versus a polyethylene oxide standard measured by gel permeation chromatography using dimethyl formamide as eluent was 265,000 when measured on the pellets prior to compounding and about 70,000 when measured on the TPU after being molded into tensile bars or parts.

Polycarbonate (indicated by melt flow rate—MFR)

PC MFR 6 is a commercially available thermoplastic polycarbonate Calibre TM 301, sold by The Dow Chemical Company, derived from bisphenol A having a weight average molecular weight of 30,700 and a melt flow rate of 6 g/10 minutes at 300° C. and 2.8 kg weight (ASTM D-1238).

PC MFR 15 is a commercially available thermoplastic polycarbonate Calibre TM 300-15, sold by The Dow Chemical Company, derived from bisphenol A having a weight average molecular weight of 25,000 and a melt flow rate of 15 g/10 minutes at 300° C. and 2.8 kg weight (ASTM D-1238).

PC MFR 80 is a commercially available thermoplastic polycarbonate Calibre TM 1001-CD, sold by The Dow Chemical Company, derived from bisphenol A having a molecular weight of 16,900 and a melt flow rate of 80 g/10 minutes at 300° C. and 2.8 kg weight (ASTM D-1238).

Impact Modifier (MBS)

MBS is Paraloid (TM) EXL-3607, a commercially available MBS-type impact modifier.

The blends of the following examples are prepared in a 0.8 inch Welding Engineers twin-screw extruder operating at 250 rpm, front zone temperature 430° F. (221° C.), rear zone temperature 415° F. (213° C.). The polycarbonate, TPU and MBS polymers were dried prior to blending for at least 4 hours in a desicant air dryer at about 190° F. (88° C.).

Molded articles from the blends are prepared by injection molding using an Arbury 28 ton injection molder operating at an injection pressure of 1000 psi (7 MPa), a holding pressure of 650 psi (4.5 MPa), a barrel temperature of 205°-220° C., and a mold temperature of 35°-40° C. Prior to molding, the granular blend is dried at 100° C. for 4 hours in a dehumidifying dryer.

The compositions of the blends prepared and the properties of the molded articles obtained from the blends are as indicated in Table I. The tests are performed using the indicated test methods, results given in the indicated units and the following abbreviations are used in the Tables:

MFR—Melt flow rates of the polycarbonate, ASTM D-1238 (Condition O), grams per 10 minutes;

Izod—Notched izod impact resistance at the indicated temperatures, ASTM D-256-84, foot pounds per inch or ft.lb/in (Joules per meter or J/m), the double asterisk (**) indicates that the testing temperature was very nearly the ductile/brittle transition point for that composition where some of the samples exhibited ductile failures and some exhibited brittle, the notation NB indicates that the sample did not break in the test;

DTUL—Distortion temperature under load, ASTM D-645 at a pressure of 66 pounds per square inch (0.455 MPa), °F. (°C.); on unannealed 0.125 inch by 0.5 inch (3.2 mm by 12.7 mm) test bars;

TY & % E—Tensile strength at yield and percent elongation at yield, ASTM D-638 at 2.0 inches per minute (5.08 mm per min), pounds per square inch (MPa) and percent, respectively;

Flex Mod—Flexural modulus, ASTM D-790-84, pounds per square inch (MPa);

MBS %—Weight percent MBS component in the blend based on weight of the PC and TPU.

*—Comparative experiment, not an example of the present invention.

TABLE I

| | | | | | | | Izod −30° F. ft. lb/ | Izod −40° F. ft. lb/ | |
|---|---|---|---|---|---|---|---|---|---|
| Expt No | % PC (MFR) | TPU % | MBS % | TY psi (MPa) | % E | Flex Mod psi (MPa) | in (J/m) | in (J/m) | DTUL °F. (°C.) |
| 1* | 60 (6) | 40 | 0 | 4460 (31.2) | 122 | 90000 (630) | 9.7** (510) | 4.4 (235) | 225 (107) |
| 2* | 60 (15) | 40 | 0 | 4660 (32.6) | 119 | 100000 (700) | 18.8 (1015) | 13.2** (713) | 236 (113) |
| 3* | 60 (80) | 40 | 0 | 4750 (32.2) | 103 | 184000 (1290) | 11.1** (599) | 2.1 (113) | 249 (121) |

TABLE I -continued
POLYCARBONATE/URETHANE BLENDS

| Expt No | % PC (MFR) | TPU % | MBS % | TY psi (MPa) | % E | Flex Mod psi (MPa) | Izod −30° F. ft. lb/in (J/m) | Izod −40° F. ft. lb/in (J/m) | DTUL °F. (°C.) |
|---|---|---|---|---|---|---|---|---|---|
| 4 | 60 (6) | 40 | 7 | 4110 (28.8) | 119 | 78000 (546) | 16.0 (864) | 14.9 (805) | 201 (94) |
| 5 | 60 (15) | 40 | 7 | 4210 (29.5) | 115 | 100000 (700) | 16.5 (891) | 15.7 (848) | 216 (102) |
| 6 | 60 (80) | 40 | 7 | 4520 (31.6) | 116 | 149000 (1043) | 12.5 (675) | 11.7 (632) | 239 (115) |

TABLE II
POLYCARBONATE/URETHANE BLENDS

| Expt No | % PC (MFR) | TPU % | MBS % | TY psi (MPa) | % E | Flex Mod psi (MPa) | Izod −30° F. ft. lb/in (J/m) | Izod −40° F. ft. lb/in (J/m) | DTUL °F. (°C.) |
|---|---|---|---|---|---|---|---|---|---|
| 7* | 50 (6) | 50 | 0 | 3950 (27.6) | 159 | 55000 (385) | 20.0 (1080) | 2.9 (157) | 175 (79) |
| 8* | 50 (80) | 50 | 0 | 4510 (31.6) | 132 | 139000 (973) | 9.7** (510) | 1.9 (103) | 219 (104) |
| 9 | 50 (6) | 50 | 7 | 4050 (28.4) | 168 | 51000 (357) | 17.8 (961) | 17.8 (961) | 143 (62) |
| 10 | 50 (80) | 50 | 7 | 4610 (32.3) | 171 | 103000 (721) | 17.2 (929) | 17.6 (950) | 218 (103) |

TABLE III
POLYCARBONATE/URETHANE BLENDS

| Expt No | % PC (MFR) | TPU % | MBS % | TY psi (MPa) | % E | Flex Mod psi (MPa) | Izod −30° F. ft. lb/in (J/m) | Izod −40° F. ft. lb/in (J/m) | DTUL °F. (°C.) |
|---|---|---|---|---|---|---|---|---|---|
| 11* | 35 (6) | 65 | 0 | 4090 (28.6) | 212 | 24000 (168) | 26.4 (1426) NB | 7.4** (400) | 123 (51) |
| 12* | 35 (80) | 65 | 0 | 3790 (26.5) | 172 | 69000 (483) | 24.1 (1301) NB | 6.2** (335) | 167 (75) |
| 13 | 35 (6) | 65 | 7 | 4300 (30.1) | 192 | 24000 (168) | 24.0 (1296) NB | 23.4 (1264) | 122 (50) |
| 14 | 35 (80) | 65 | 7 | 4260 (29.8) | 222 | 41000 (287) | 25.8 (1393) NB | 7.7** (416) | 150 (66) |

As can be seen from the above data, the compositions according to the present invention exhibit surprisingly good combinations of heat resistance, low temperature toughness, and low modulus. The use of TPU and impact modifier (MBS) in the polycarbonate provide a unique improvement in both low modulus and improved low temperature toughness that has been previously unobtainable, and particularly the combination of low modulus and a ductile/brittle transition of −40° F. and lower. In the comparative compositions containing no impact modifier (Experiments 1-3 versus Experiments 7-8 versus Experiments 11-12) it can be seen that increasing the amount of the softer TPU provided the blends with improved impact resistance but only the use of the additional impact modifier was successful in lowering the temperature at which the failure mechanism changed from ductile to brittle to temperature in the range of of −30° F. and −40° F. This, together with the balance of properties which are maintained, are particularly desirable features for resins that are to be used in automotive applications.

What is claimed is:

1. A thermoplastic resin blend comprising:
   (a) from about 35 to less than about 60 percent by weight of a thermoplastic aromatic carbonate polymer having a molecular weight of from about 12,000 to about 100,000;
   (b) from about 65 to greater than about 40 percent of a thermoplastic polyurethane; and
   (c) from about 1 to about 20 percent of an impact modifier, wherein said impact modifier comprises a butadiene polymer rubber substrate component and a grafted rigid phase polymer of a homo- or copolymer of methylmethacrylate said weight percents (a), (b) and (c) being based on the combined weights of (a) and (b).

2. A blend according to claim 1 wherein said thermoplastic polycarbonate is further characterized by having a molecular weight from about 15,000 to about 35,000.

3. A blend according to claim 1 wherein said thermoplastic polyurethane is further characterized by having a hardness of from about 70A to about 70D.

4. A blend according to claim 1 wherein the thermoplastic polycarbonate is prepared from bisphenol-A.

5. A blend according to claim 1 comprising from about 40 to about 60 weight percent thermoplastic polycarbonate.

6. A blend according to claim 1 comprising from about 4 to about 15 percent impact modifier by weight based on combined weight of (a) and (b) above.

7. A blend according to claim 1 which, when molded, has a flexural modulus value of less than about 200,000 pounds per square inch (psi), a heat distortion temperature under load of at least 100° F. at 66 psi and a notched Izod impact resistance of at least 5 foot pounds per inch (ft lbs/in) at −30° F.

8. A blend according to claim 7 which, when molded, has a flexural modulus value of less than about 175,000 psi, a heat distortion temperature under load of at least 120° F. at 66 psi, and a notched Izod impact resistance of at least 5 ft lbs/in at −40° F.

9. An automotive part prepared from a blend according to claim 1.

10. An automobile bumper facia prepared from a blend according to claim 7.

* * * * *